(12) United States Patent  
Sase

(10) Patent No.: US 8,629,382 B2
(45) Date of Patent: Jan. 14, 2014

(54) AUTO FOCUS APPARATUS FOR DETECTING A FOCAL POINT WITH A SETTING SECTION FOR SHIFTING AN IRRADIATION POSITION OUTSIDE AN OBSERVATION FIELD OF AN IMAGING SECTION

(75) Inventor: Ichiro Sase, Yokohama (JP)

(73) Assignee: Nikon Corporation, Tokyo (JP)

( * ) Notice: Subject to any disclaimer, the term of this patent is extended or adjusted under 35 U.S.C. 154(b) by 623 days.

(21) Appl. No.: 12/676,095

(22) PCT Filed: Aug. 29, 2008

(86) PCT No.: PCT/JP2008/065585
§ 371 (c)(1),
(2), (4) Date: Apr. 29, 2010

(87) PCT Pub. No.: WO2009/031477
PCT Pub. Date: Mar. 12, 2009

(65) Prior Publication Data
US 2011/0127406 A1    Jun. 2, 2011

(30) Foreign Application Priority Data

Sep. 3, 2007   (JP) ................................. 2007-227651

(51) Int. Cl.
*G02B 27/40* (2006.01)
*H01J 3/14* (2006.01)
*G01J 1/00* (2006.01)

(52) U.S. Cl.
USPC .......................... 250/201.2; 250/216; 356/123

(58) Field of Classification Search
USPC ........ 250/201.4, 458.1, 201.3, 201.1, 559.29, 250/206, 214 R, 214.1, 208.1, 226, 216, 250/201.2, 201.8, 201.9, 239; 356/123, 356/609, 624, 904; 359/368, 382, 383, 385, 359/396, 398; 369/112.09, 112.01, 112.23, 369/112.29
See application file for complete search history.

(56) References Cited

U.S. PATENT DOCUMENTS 5,583,342 A * 12/1996 Ichie .......................... 250/459.1
5,589,936 A * 12/1996 Uchikawa et al. ............ 356/450
(Continued)

FOREIGN PATENT DOCUMENTS

JP       10-133117 A     5/1998
JP     2002-328297 A    11/2002
(Continued)

OTHER PUBLICATIONS

JP 10-133117 is a machine translation of a JP publication listed by Applicant in the Applicant's IDS.*

(Continued)

*Primary Examiner* — Que T Le
*Assistant Examiner* — Jennifer Bennett
(74) *Attorney, Agent, or Firm* — Osha Liang LLP

(57) ABSTRACT

An reference light emitted from an LED for auto focus enters a glass cover, on which a sample is adhered to, via a half mirror to an objective lens. The reference light that entered the glass cover is reflected by the boundary surface to be reflected light, and this reflected light enters a dichroic mirror via an objective lens. A part transmits the reflected light and allows the light to enter the camera via the dichroic mirror to the lens. A user rotates a motor-operated mirror while viewing the image of the reference light captured by a camera, so as to shift the reference light image position on the boundary surface.

4 Claims, 12 Drawing Sheets

(56) References Cited

U.S. PATENT DOCUMENTS

| | | | |
|---|---|---|---|
| 6,169,289 B1 * | 1/2001 | White et al. | 250/458.1 |
| 6,207,960 B1 * | 3/2001 | Stern | 506/39 |
| 6,248,988 B1 * | 6/2001 | Krantz | 250/201.3 |
| 6,563,586 B1 * | 5/2003 | Stanke et al. | 356/445 |
| 2004/0108447 A1 * | 6/2004 | Curry et al. | 250/234 |
| 2004/0113043 A1 * | 6/2004 | Ishikawa et al. | 250/201.4 |
| 2005/0057749 A1 * | 3/2005 | Dietz et al. | 356/318 |
| 2005/0068614 A1 * | 3/2005 | Yoneyama et al. | 359/368 |
| 2005/0179903 A1 * | 8/2005 | Tsuruta et al. | 356/445 |
| 2006/0291039 A1 | 12/2006 | Eda et al. | |

FOREIGN PATENT DOCUMENTS

| | | |
|---|---|---|
| JP | 2004-070276 A | 3/2004 |
| JP | 2005-316070 A | 11/2005 |
| JP | 2008-116900 A | 5/2008 |

OTHER PUBLICATIONS

Extended European Search Report Issued in European Application No. 08829327.9, Dated Jul. 9, 2012 (10 Pages).

Patent Abstracts of Japan, Publication No. 10-133117, dated May 22, 1998, 1 page.

Patent Abstracts of Japan, Publication No. 2004-070276, dated Mar. 4, 2004, 1 page.

Patent Abstracts of Japan, Publication No. 2002-328297, dated Nov. 15, 2002, 1 page.

Patent Abstracts of Japan, Publication No. 2005-316070, dated Nov. 10, 2005, 1 page.

Patent Abstracts of Japan, Publication No. 2008-116900, dated May 22, 2008, 1 page.

International Search Report issued in PCT/JP2008/065585, mailed on Oct. 21, 2008, with translation, 7 pages.

Office Action issued in Japanese Application No. 2009-531214, mailed on Feb. 26, 2013, and translation thereof (8 pages).

* cited by examiner

AUTO FOCUS APPARATUS FOR DETECTING A FOCAL POINT WITH A SETTING SECTION FOR SHIFTING AN IRRADIATION POSITION OUTSIDE AN OBSERVATION FIELD OF AN IMAGING SECTION

TECHNICAL FIELD

The present invention relates to an auto focus apparatus and a microscope, and more particularly to an auto focus apparatus and a microscope with which observation environment of a sample in the microscope can be improved.

BACKGROUND ART

Some conventional auto focus apparatuses condense reference light emitted from the light source for auto focus onto a sample, receives the reference light reflected from a sample using a photodetector, and positions the focal point of an objective lens based on this light receiving intensity (e.g. see Japanese Patent Application Laid-Open No. 2002-328297). In such an auto focus apparatus, a plate spring actuator mirror, which changes the optical path of the reference light by rotating the reflecting surface, is disposed, so that the reference light can be moved to a position different from the observation center (optical axis) of the objective lens by rotating the reflecting surface of the plate spring actuator mirror. Therefore even if there is a step difference in an observation field of the objective lens on the sample, the focal point of the objective lens can be stably positioned by moving the image forming position of the reference light.

SUMMARY OF THE INVENTION

One or more embodiments of the present invention relate to an auto focus apparatus that is installed in a microscope, comprising: a light source which irradiates an auxiliary light for focal point detection onto an object; an illumination optical system for focusing which forms an optical image based on the auxiliary light from the light source on the object via an objective lens; an imaging optical system for focusing which forms a reflected image of the optical image by receiving the reflected light of the optical image from the object via the objective lens; a photoelectric converter which is disposed in an imaging position of the reflected image by the imaging optical system for focusing, and detects the reflected image; wavelength selection means, disposed on an optical path of the illumination optical system for focusing, for visualizing the auxiliary light; and irradiation path change means, disposed on a common optical path of the illumination optical system for focusing and the imaging optical system for focusing, for shifting the irradiation optical path of the auxiliary light directed to the objective lens and changing the imaging position of the auxiliary light on the object.

Other aspects and advantages of the invention will be apparent from the following description and the appended claims.

Figure 1:
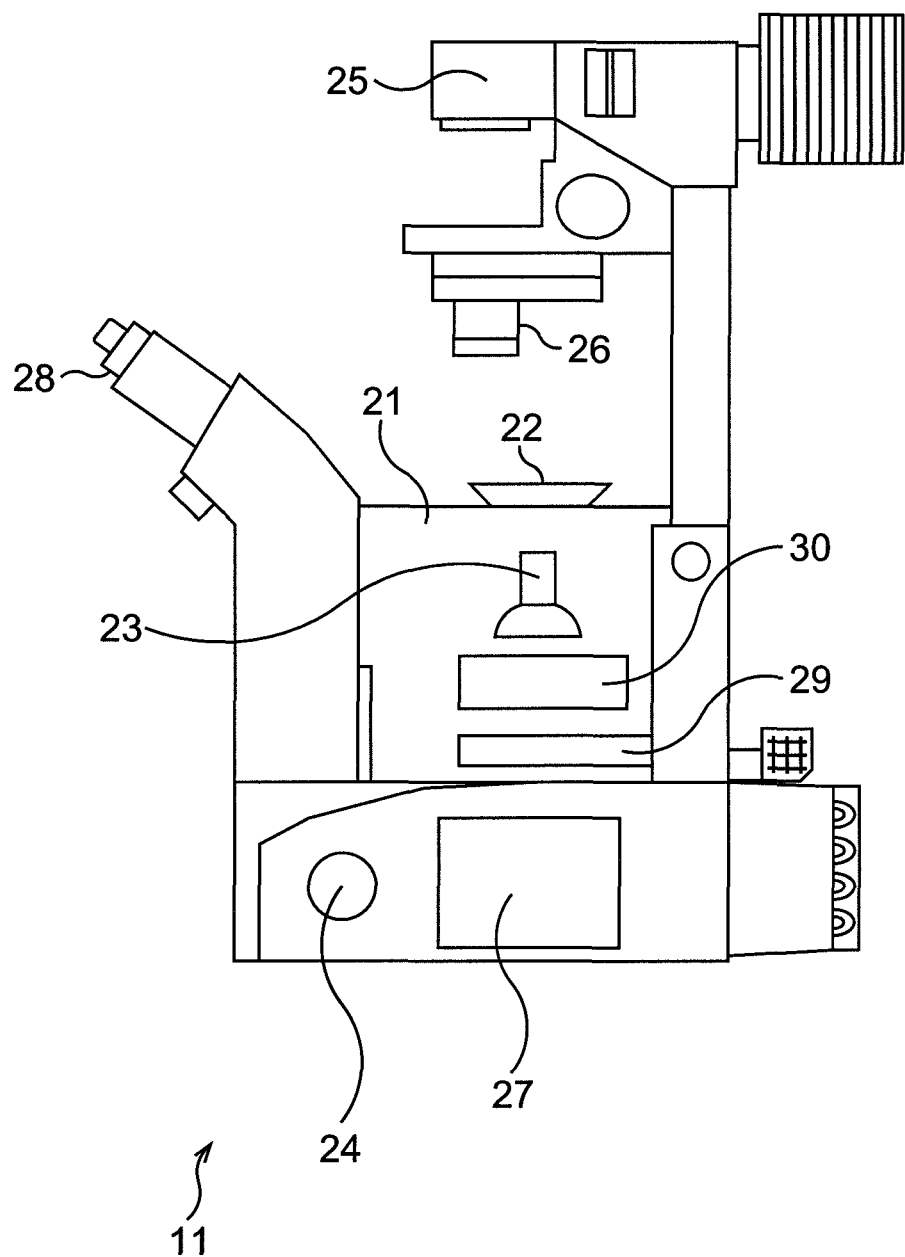
FIG. 1 is a diagram depicting a configuration example of an embodiment of a microscope to which the present invention is applied.

EXPLANATION OF REFERENCE NUMERALS 11 microscope
23 objective lens
27 camera
28 ocular
29 excitation light source
30 auto focus unit
61 LED
62 offset lens group
63 dichroic mirror
64 CCD
65 filter
135 motor-operated mirror
193 diaphragm
231 mirror control unit
232 mirror drive unit
233 control unit
261 manually-operated mirror
262 operation unit

DETAILED DESCRIPTION

Embodiments of the present invention will now be described as reference to the drawings.

FIG. 1 is a diagram depicting a configuration example of an embodiment of the microscope to which the present invention is applied.

A microscope 11 is a fluorescent microscope for irradiating the excitation light with a predetermined wavelength on a sample, and observing the fluorescent light emitted from the sample. In the microscope 11, a motor-operated stage 21 is disposed and an observation target sample 22 is disposed on the motor-operated stage 21. In the motor-operated stage 21 in FIG. 1, an objective lens 23 is disposed in a position facing the sample 22 from the bottom, and the user who observes the sample can move the objective lens 23 in the vertical direction shown in FIG. 1, by operating a vertical motion operation unit 24 that is disposed at the lower left of the microscope 11.

In the upper portion of the microscope 11, an illumination optical system 25, which emits illumination light to illuminate the sample 22, is disposed for performing bright field observation on the sample 22. The illumination light emitted from the illumination optical system 25 is condensed by a lens 26, which is disposed directly under the illumination optical system 25, and is irradiated onto the sample 22 placed on the motor-operated stage 21. The illumination light irradiated onto the sample 22 transmits through the sample 22 and becomes an observation light, and this observation light is condensed by the objective lens 23 and enters a camera 27 and an ocular 28 via an optical system, which is not illustrated.

The camera 27 captures the image of the sample 22 by performing photoelectric conversion on the observation light which entered through the objective lens 23, and supplies the captured image to a device, which is not illustrated. The observation light which entered the ocular 28 through the objective lens 23 is condensed by the ocular 28, and an image of the sample 22 is formed. Thereby the user can observe the sample 22 through the occular 28. The user can also observe the sample 22 by viewing an image displayed on a device connected to the camera 27.

The microscope 11 encloses an excitation light source 29 which emits excitation light for exciting the sample 22, and an auto focus unit 30 which obtains information for controlling the movement of the objective lens 23 upon auto focusing.

When the sample 22 is observed with fluorescent light, the excitation light source 29 emits the excitation light, and irradiates the excitation light onto the sample 22 via the optical system, which is not illustrated, and the objective lens 23. Thereby the sample 22 emits the fluorescent light, and the fluorescent light emitted from the sample 22 enters the camera 27 and the ocular 28 via the objective lens 23 and an optical system, which is not illustrated. Therefore the user can observe the fluorescent light from the sample 22 in the image displayed on the device connected to the camera 27, or observe the fluorescent light through the ocular 28.

The auto focus unit 30, such as a slit photographing system, emits a reference light, such as near infrared light, used for auto focus, for example, and irradiates the reference light onto the sample 22 via an optical system, which is not illustrated, and the objective lens 23. Then the reference light, which is radiated onto and reflected from the sample 22, becomes a reflected light, and enters the auto focus unit 30 via the objective lens 23 and an optical system, which is not illustrated, and the auto focus unit 30 receives the entered reflected light. Then based on the received light intensity of the reflected light, which the auto focus unit 30 received, the microscope 11 moves the objective lens 23 in the vertical direction, so that the focal point of the objective lens 23 is located at a desired position of the sample 22, that is, so that the space of the objective lens 23 and the sample 22 become constant.

The auto focus unit 30 may be disposed in the microscope 11, or may be an apparatus which is different from the microscope 11, and is attached to the microscope 11 when the auto focus unit 30 is needed.

Now the principle of the offset type auto focus will be described with reference to FIG. 2.

Figure 2:
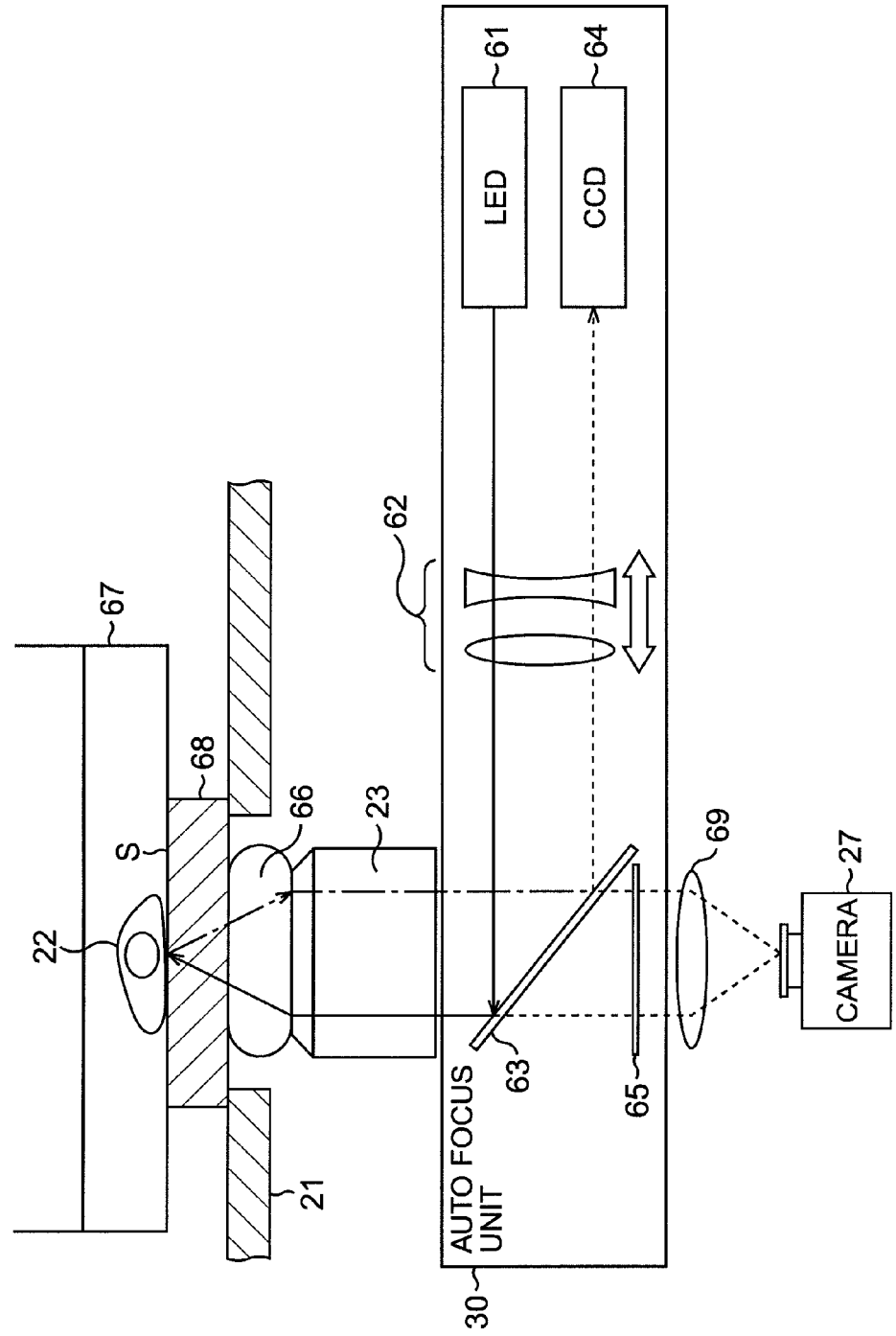
FIG. 2 is a diagram depicting a principle of auto focus.

As FIG. 2 shows, the auto focus unit 30 has an LED (Light Emitting Diode) 61 which is a light source for emitting the reference light, an offset lens group 62 which condenses the reflected light, a dichroic mirror 63 which allows the condensed reference light to enter the objective lens 23, a CCD (Charge Coupled Device) 64 which receives the reflected light, and a filter 65 which transmits the reflected light (reference light) and fluorescent light from the sample 22.

The reference light emitted from the LED 61 enters the dichroic mirror 63 via the offset lens group 62 (telescopic system, consisting of a convex lens and concave lens). A part of the reference light that entered the dichroic mirror 63 is reflected by the dichroic mirror 63, and enters the objective lens 23. The reference light that entered the objective lens 23 is condensed by the objective lens 23, and enters a glass bottom dish 67 disposed on the motor-operated stage 21 via liquid 66, which is on the objective lens 23. The reference light that entered the glass bottom dish 67 is reflected on the boundary surface S of a glass cover 68, which is disposed on the bottom of the glass bottom dish 67.

In other words, a hole is opened at the center of the motor-operated stage 21, and the glass bottom dish 67 is placed on the motor-operated stage 21 so that the glass cover 68 is located at the hole portion, and the glass cover 68 locates very close to the objective lens 23. The space between the glass cover 68 and the objective lens 23 is filled with liquid 66, such as oil or water, that has an approximately same refractive index as the objective lens 23.

The glass bottom dish 67 is filled with a culture solution, and cells, as the sample 22, adhere to a transparent glass cover 68 disposed at the bottom of the glass bottom dish 67.

The objective lens 23 condenses the entered reference light and allows the condensed reference light to enter the glass cover 68 via the liquid 66. The refractive index of the culture solution that fills the glass bottom dish 67 and the refractive index of the glass cover 68 have some difference. Therefore the reference light that entered the glass cover 68 is reflected on the top surface of the glass cover 68, that is, the boundary surface S between the sample 22 (culture solution) and the glass cover 68, as shown by the arrows in FIG. 2.

When the reference light is reflected by the boundary surface S of the glass cover 68 and becomes a reflected light, the reflected light enters the dichroic mirror 63 via the liquid 66 and the objective lens 23. The dichroic mirror 63 reflects a part of the entered reflected light to allow it to enter the offset lens group 62, and transmits the rest of the reflected light to allow it to enter the filter 65.

The filter 65 passes only light having a wavelength the same as the wavelength of a fluorescent light emitted from the sample 22, out of the entered light. Therefore if the reference light (reflected light) has a wavelength the same as that of the fluorescent light, the reference light (reflected light) that entered from the dichroic mirror 63 to the filter 65 passes through the filter 65 and enters an imaging lens 69 that is disposed in the microscope 11. The reference light (reflected light) which entered the imaging lens 69 is condensed by the imaging lens 69, and enters a camera 27 so as to be imaged by the camera 27.

Here it is assumed that the optical system between the objective lens 23 and the imaging lens 69 is a parallel optical system.

The reference light (reflected light) which is reflected by the dichroic mirror 63 enters the CCD 64 via the offset lens group 62. The CCD 64 is constituted by a line CCD, for example, and receives the reference light (reflected light) that entered from the offset lens group 62. A focal point detection circuit, which is not illustrated, controls the movement of the objective lens 23 so that an image of the reflected light is formed on the boundary surface S, based on the photoelectric conversion signal from the CCD 64. The offset lens group 62 is constituted by a telescopic optical system that consists of a convex lens and a concave lens.

More specifically, the reference light emitted from the LED 61 becomes slit formed (rectangular) light by the optical system between the LED 61 and the offset lens group 62, so the CCD 64 receives slit formed reflected light.

The focal point detection circuit, which is not illustrated, of the microscope 11 moves the objective lens 23 in the optical axis direction based on the signal obtained by the CCD 64 receiving the reflected light, that is, the signal that indicates the light receiving intensity in each pixel on the light receiving surface of the CCD 64. Thereby the objective lens 23 can observe the boundary surface S.

Then offset can be generated between the focal position of the objective lens 23 and the focal position of the optical system of the auto focus unit 30 by moving the offset lens group 62, whereby the inside of the sample 22 can be observed. In a state where the offset lens group 62 is not moved (hereafter "initial state"), the optical system of the auto focus unit 30 is set so that the image forming position of the reference light is the same as the focal position of the objective lens 23.

In this initial state, the focal position of the objective lens 23 and the image forming position image of the reference light are on the boundary surface S, but the sample 22 which is an observation target, is positioned on the top of the boundary surface S in FIG. 2, so the sample 22 becomes blurred in the image captured by the camera 27.

By relatively moving the convex and concave lenses in the optical axis direction of the offset lens group 62, that is, in the left and right directions in FIG. 2, the image forming position of the reference light can be moved in the optical axis direction of the objective lens 23, and the inside of the sample 22 can be observed.

If the user secures the offset lens group 62 without moving in a state where the distance of the image forming position of the reference light and the focal position of the objective lens 23 become a predetermined offset amount, then even if the position of the image of the reference light is shifted due to an inclination of the glass bottom dish 67 when the motor-operated stage 21 is activated and the observation point is shifted in the X and Y directions, the objective lens 23 is immediately moved by the microscope 11, so the focal point of the objective lens 23 is always located on the sample 22.

In this way, even if the motor-operated stage 21 is activated and the observation point is moved in the state of constantly activating the offset type auto focus, the user can observe (capture an image of) the sample 22 that is always in focus, without requiring any other operation.

Figure 5:
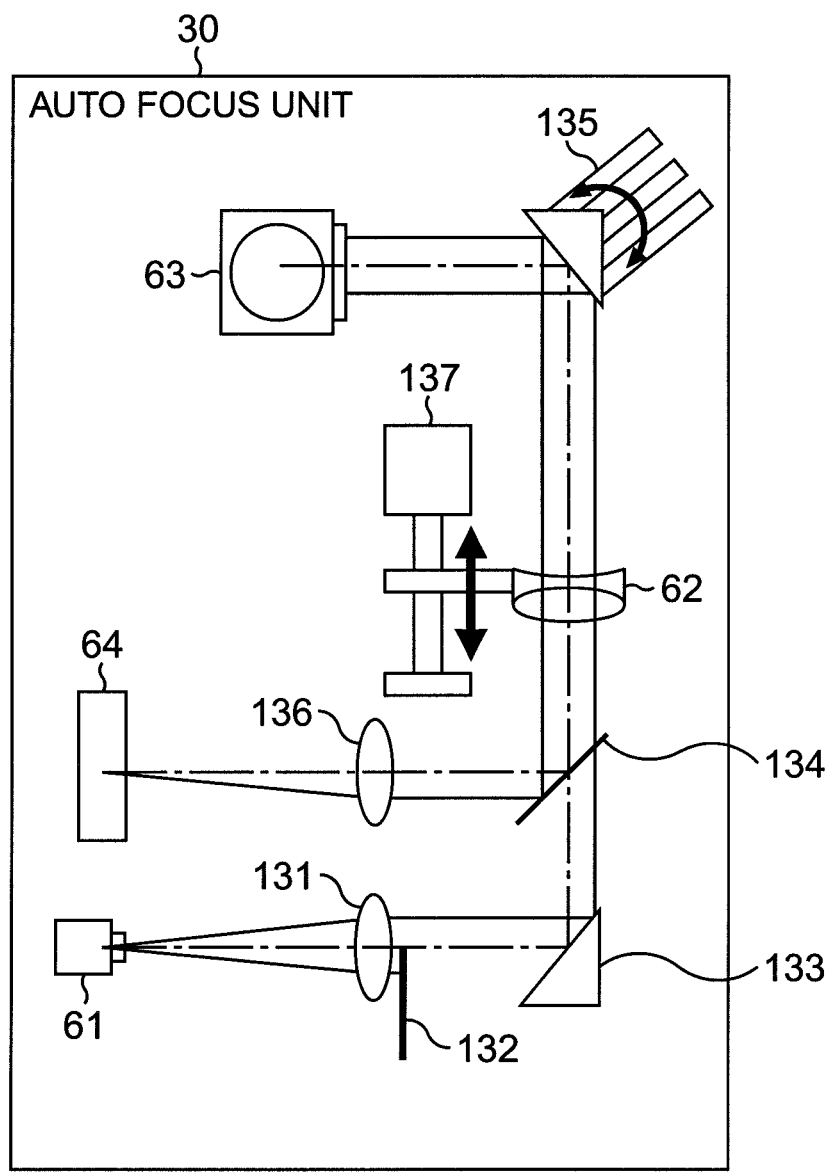
FIG. 5 is a diagram depicting a configuration example of an auto focus unit.

The position of the offset lens group 62 is not limited to the position in FIG. 5, but may be between the half mirror 134 and the lens 136 and/or between the mirror 133 and the lens 131 in FIG. 5, for example.

Figure 3:
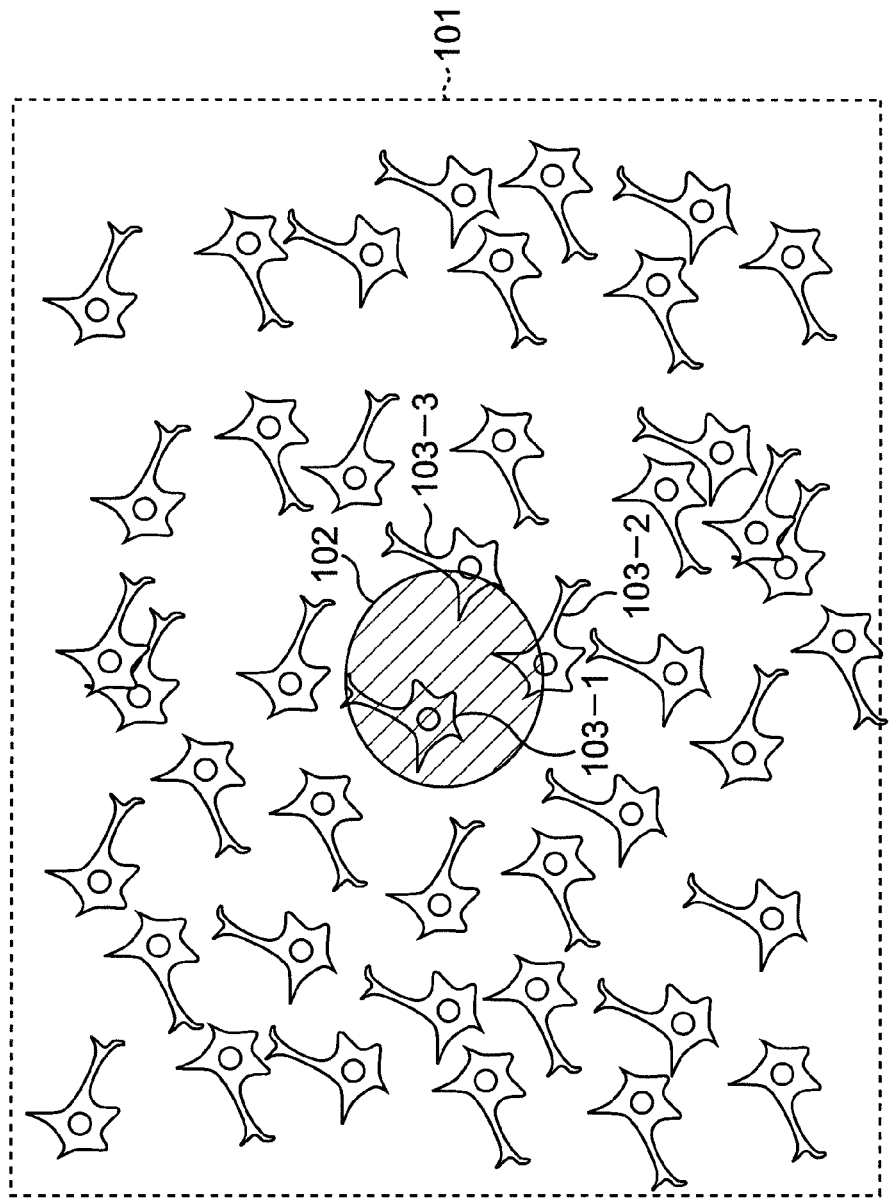
FIG. 3 is a diagram depicting a position of an image of the reference light in a visual field.

In this case, if an image of the reference light is located on the optical axis of the objective lens 23, the image of the reference light comes to the center of the visual field of the microscope 11, as shown in FIG. 3, which is a problem. In FIG. 3, the area 101 shows an area of the visual field of the microscope 11.

In the auto focus unit 30, the filter 65 for transmitting the fluorescent light and reflected light from the sample 22 is disposed, so if the reference light (reflected light) reflected on the boundary surface S has a band wavelength close to the wavelength of the fluorescent light, the reference light enters the camera 27 through the objective lens 23, dichroic mirror 63, filter 65 and imaging lens 69, and the image of the fluorescent light and image of the reference light are captured by the camera 27. Therefore if the wavelength of the fluorescent light emitted from the sample 22 (cultured cells 103) is close to the wavelength of the reference light, for example, as shown in FIG. 4, the intensity of the fluorescent light emitted from the cultured cells 103, of which a part or all overlap with the image 102 of the reference light in FIG. 3, cannot be measured correctly.

Figure 4:
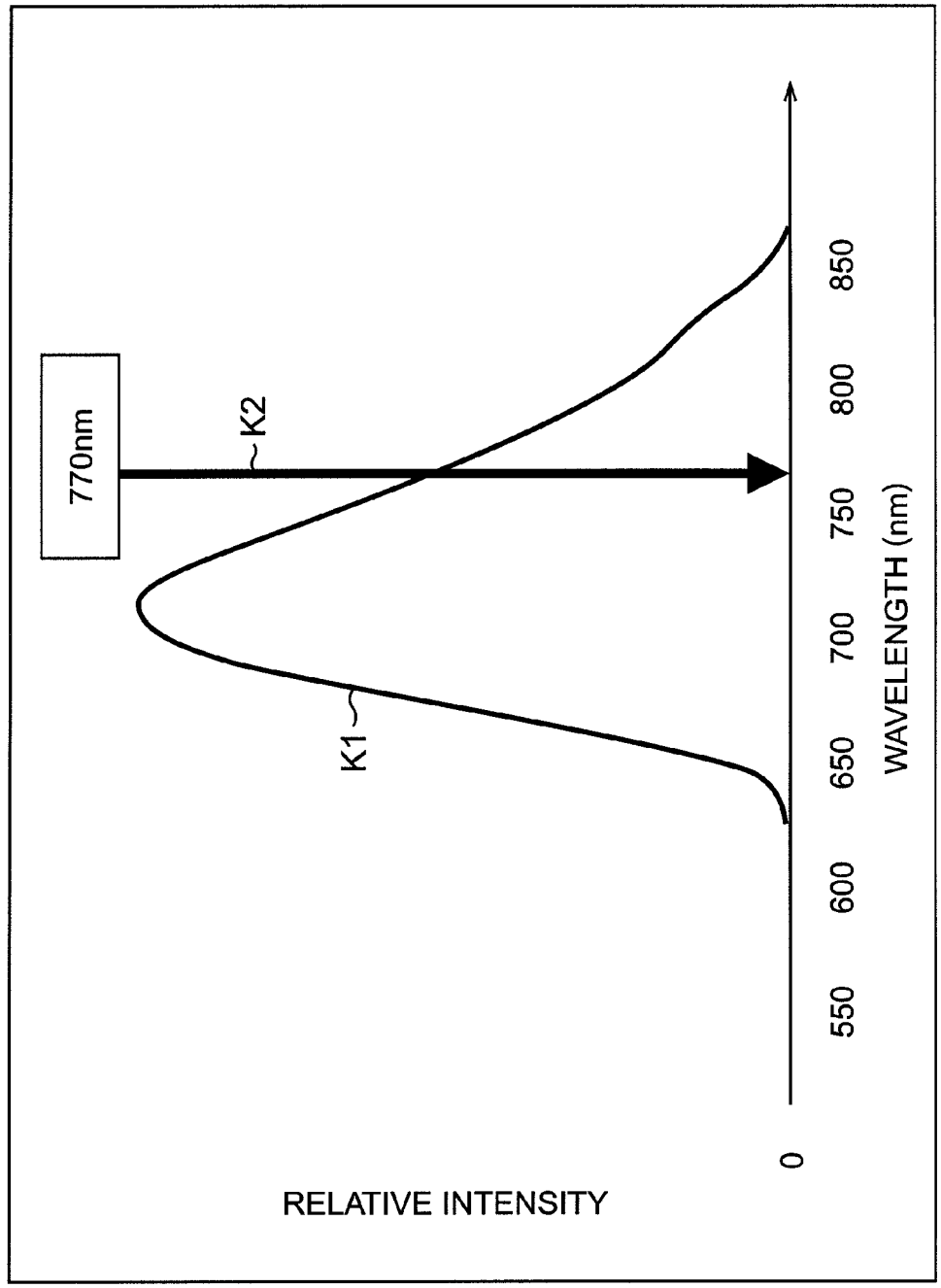
FIG. 4 is a graph depicting the relationship of the fluorescent light and wavelength of the reference light.

In FIG. 4, the ordinate indicates a relative intensity of the fluorescent light emitted from the sample 22, and the abscissa indicates the wavelength. The curve K1 indicates the relative intensity of the fluorescent light at each wavelength, and the arrow mark K2 indicates the wavelength of the reference light.

According to FIG. 4, the fluorescent light emitted from the sample 22 is light of which wavelength is 630 nm to 850 nm, and the fluorescent light contains a large amount of light of which wavelength is around 700 nm. The wavelength of the reference light is 770 nm, as shown by the arrow mark K2, which means that the fluorescent light contains light with the same wavelength as the reference light. As a result, as shown in FIG. 3, the fluorescent light emitted from the cultured cells 103 and the reference light are contained in the light observed around the center of the visual field of the microscope 11, and the intensity of the fluorescent light cannot be measured accurately.

In the area 101, which is the visual field of the microscope 11, not only the cultured cells as the sample 22, but also the image 102 of the reference light is observed (captured), which affects the analysis of the fluorescent image of the sample 22.

In FIG. 3, the image 102 of the reference light is positioned at the center of the visual field of the microscope 11. Therefore if the wavelength of the excitation light that is irradiated onto the sample 22 is approximately the same (close to) the wavelength of the reference light, for example, the cultured cell 103-1 to cultured cell 103-3, around the image 102 of the reference light, may be damaged. Hereafter the "cultured cell 103" is used in descriptions unless it is necessary to specify cultured cell 103-1 to cultured cell 103-3 individually.

Therefore in order for the user to observe the sample 22 in a better observation environment, the auto focus unit 30 can move the image 102 of the reference light, that is, the image forming position of the reference light, to an arbitrary position in the vertical and horizontal directions in FIG. 3.

For example, as FIG. 5 shows, a rotatable motor-operated mirror for changing the optical path of the reference light is disposed in the auto focus unit 30. FIG. 5 is a diagram depicting a more detailed configuration example of the auto focus unit 30, and is the auto focus unit 30 in FIG. 2 viewed from the top to bottom directions of FIG. 2. In FIG. 5, a portion corresponding to that in FIG. 2 is denoted with a same reference number, for which description is omitted when redundant. In FIG. 5, the dashed line indicates the optical axis.

The auto focus unit 30 is comprised of an LED 61, offset lens group 62, dichroic mirror 63, CCD 64, filter 65 (not illustrated), lens 131, half mask 132, mirror 133, half mirror 134, motor-operated mirror 135, lens 136 and stepping motor 137.

The lens 131 converts the reference light emitted from the LED 61 into parallel lights, and allows the reference light which became parallel lights to enter the mirror 133. The half mask 132 is disposed between the lens 131 and the mirror 133, and the half mask 132 blocks half of the reference light emitted from the lens 131. In FIG. 5, the lower portion of the reference light emitted from the lens 131 is blocked.

The mirror 133 reflects the reference light which entered from the lens 131, to allow it to enter the half mirror 134. The half mirror 134 transmits a part of the reference light which entered from the mirror 133 to allow it to enter the motor-operated mirror 135 via the offset lens group 62.

The motor-operated mirror 135 is a rotatable mirror, and reflects the reference light, which entered from the offset lens group 62, to allow it to enter the dichroic mirror 63. The reference light entering the dichroic mirror 63 is reflected by the dichroic mirror 63 in a direction to the front in FIG. 5, so as to enter the objective lens 23, which is not illustrated.

The motor-operated mirror 135 is positioned so that the center of the reflecting surface thereof is located on the optical axis of the offset lens group 62 and the reflecting surface forms a 45° angle with the optical axis of the offset lens group 62, and rotates by being driven by a motor, which is not illustrated. For example, it is assumed that the x axis is a straight line which passes through the center of the reflecting surface of the motor-operated mirror 135, and is in parallel with the normal line of the reflecting surface, and the z axis is a straight line which passes through the center of the reflecting surface and is perpendicular to the optical axis of the offset lens group 62 and the x axis. And if the y axis is a straight line which passes through the center of the reflecting surface and is perpendicular to the x axis and z axis, then the motor-operated mirror 135 rotates around the y axis or z axis as the rotation axis.

Therefore if the motor-operated mirror 135 rotates around the z axis as the rotation axis, for example, the optical path of the reference light that is reflected by the motor-operated mirror 135 is changed to tilt in the vertical direction, and the position of the image of the reference light on the boundary surface S also moves in the vertical direction as shown in FIG. 5. If the motor-operated mirror 135 rotates around the y axis as the rotation axis, for example, the optical path of the reference light that is reflected by the motor-operated mirror 135 is changed to tilt in the parallel direction with the z axis, and the position of the image of the reference light on the boundary surface S moves in the horizontal direction.

The reference light reflected on the boundary surface S enters the dichroic mirror 63 as reflected light, but a part of it transmits through the dichroic mirror 63. The reflected light entering the dichroic mirror 63 is reflected by the dichroic mirror 63, and enters the motor-operated mirror 135. The motor-operated mirror 135 reflects the reflected light that entered from the dichroic mirror 63, and allows this reflected light to enter the offset lens group 62.

The half mirror 134 reflects the reflected light that entered from the offset lens group 62, and allows this reflected light to enter the lens 136. The lens 136 condenses the reflected light from the half mirror 134, and forms the image thereof on the CCD 64.

The stepping motor 137 drives the offset lens group 62, and moves the offset lens group 62 in the optical axis direction.

If the optical path of the reference light is changed by oscillating the motor-operated mirror 135 in this way, then the image of the reference light on the boundary surface S can be moved in the vertical and horizontal directions in FIG. 5, without changing the image forming position of the reflected light on the light receiving surface of the CCD 64 while visually checking the image of the reference light. Therefore by oscillating the motor-operated mirror 135, the image 102 of the reference light in FIG. 3 can be moved to an arbitrary position in the visual field, such as a position distant from the center of the visual field, where the sample 22 does not exist without causing any disturbance to the auto focusing of objective lens 23. Thereby at least damage by the reference light to the sample 22 located near the center of the visual field can be prevented, and an overlap of the reference light and the fluorescent light from the sample 22 located near the center of the visual field can be prevented, and the observation environment of the sample 22 can be improved.

Figure 6:
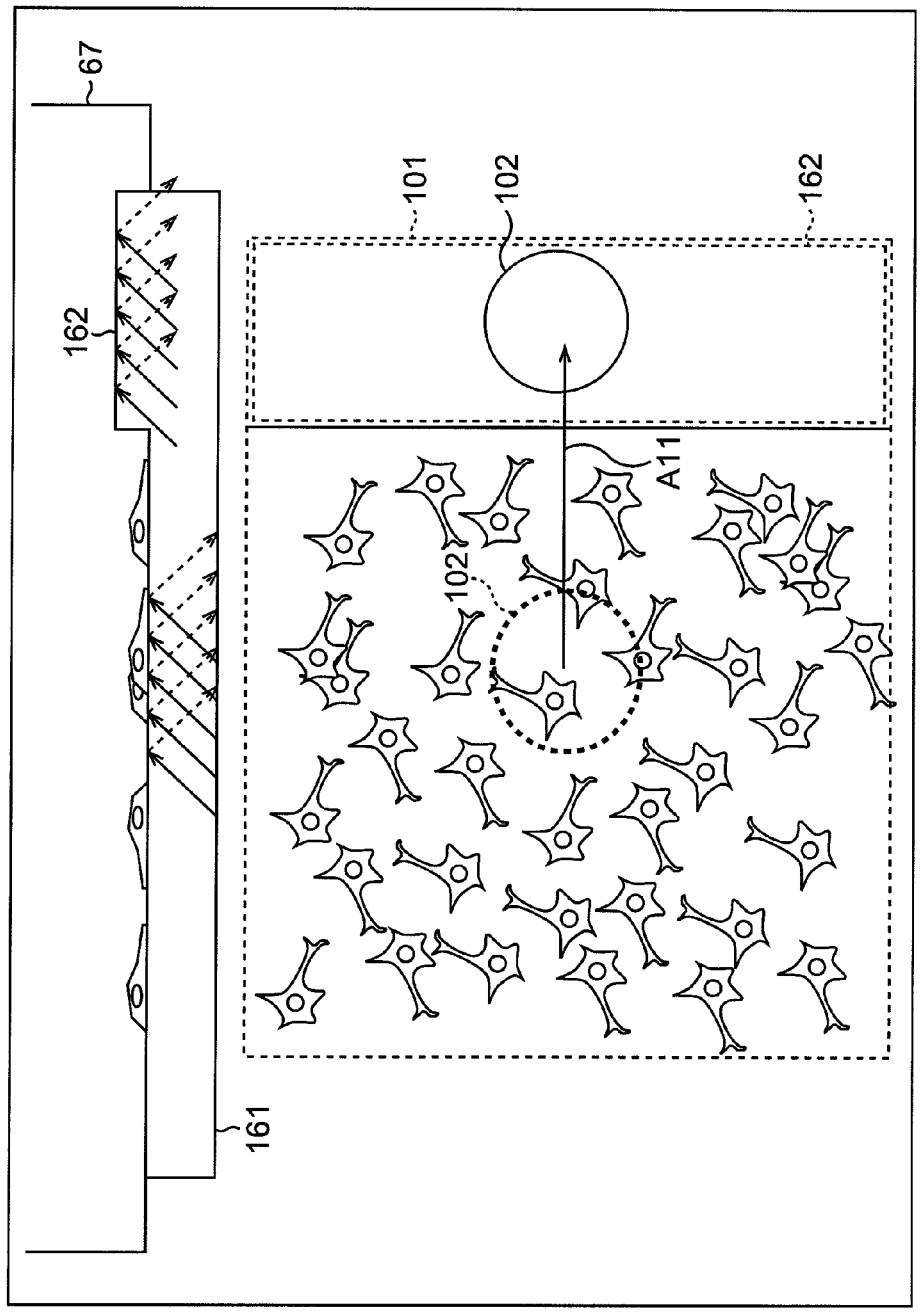
FIG. 6 is a diagram depicting a glass bottom dish.

An area for forming an image of the reference light may be disposed on the glass cover of the glass bottom dish 67, as shown in FIG. 6, for example. In FIG. 6, a portion corresponding to that in FIG. 3 is denoted with a same reference number.

In the upper side of FIG. 6, the glass bottom dish 67, where an area for forming an image of the reference light is disposed, is shown, and in the lower side of FIG. 6, an area of the visual field of the microscope 11 is shown.

In the glass cover 161 disposed at the bottom of the glass bottom dish 67 in FIG. 6, an area 162, which protrudes up is created at the right side of the top surface thereof. Few cultured cells, as the sample 22, are generated, that is, the cultured cells hardly adhere to this area 162. Therefore the cultured cells do not adhere to the area 162, out of the top surface of the glass cover 161, and the cultured cells adhere to the left side portion of the surface area 162.

Since the cultured cells do not adhere to the area 162 in this way, the user oscillates the motor-operated mirror 135 so as to move the image 102 of the reference light, which positions at the center of the area 101, in the direction indicated by the arrow mark A11, that is, in the right direction in FIG. 6, to the area 162, as shown in the lower side of FIG. 6. When the image 102 of the reference light is moved to the area 162 where the cultured cells do not adhere, the positions on which the reference light is reflected, out of the top surface of the glass cover 161, move from the center position of the surface to the area 162, as the arrow marks at the upper side of FIG. 6 show. As a result, the reflected light is reference on the boundary surface between the culture solution filled in the glass bottom dish 67 and the area 162 of the glass cover 161, and this surface becomes the boundary surface S.

By creating the area 162 for forming the image of the reference light on the surface of the glass cover 161, to be separate from the area where the cultured cells adhere as the sample 22, damage to the sample 22, that may be caused by the reference light, can be prevented, and the intensity of the fluorescent light from the sample 22 can be accurately measured. Thereby the observation environment of the sample 22 in the microscope 11 can be improved.

Figure 7:
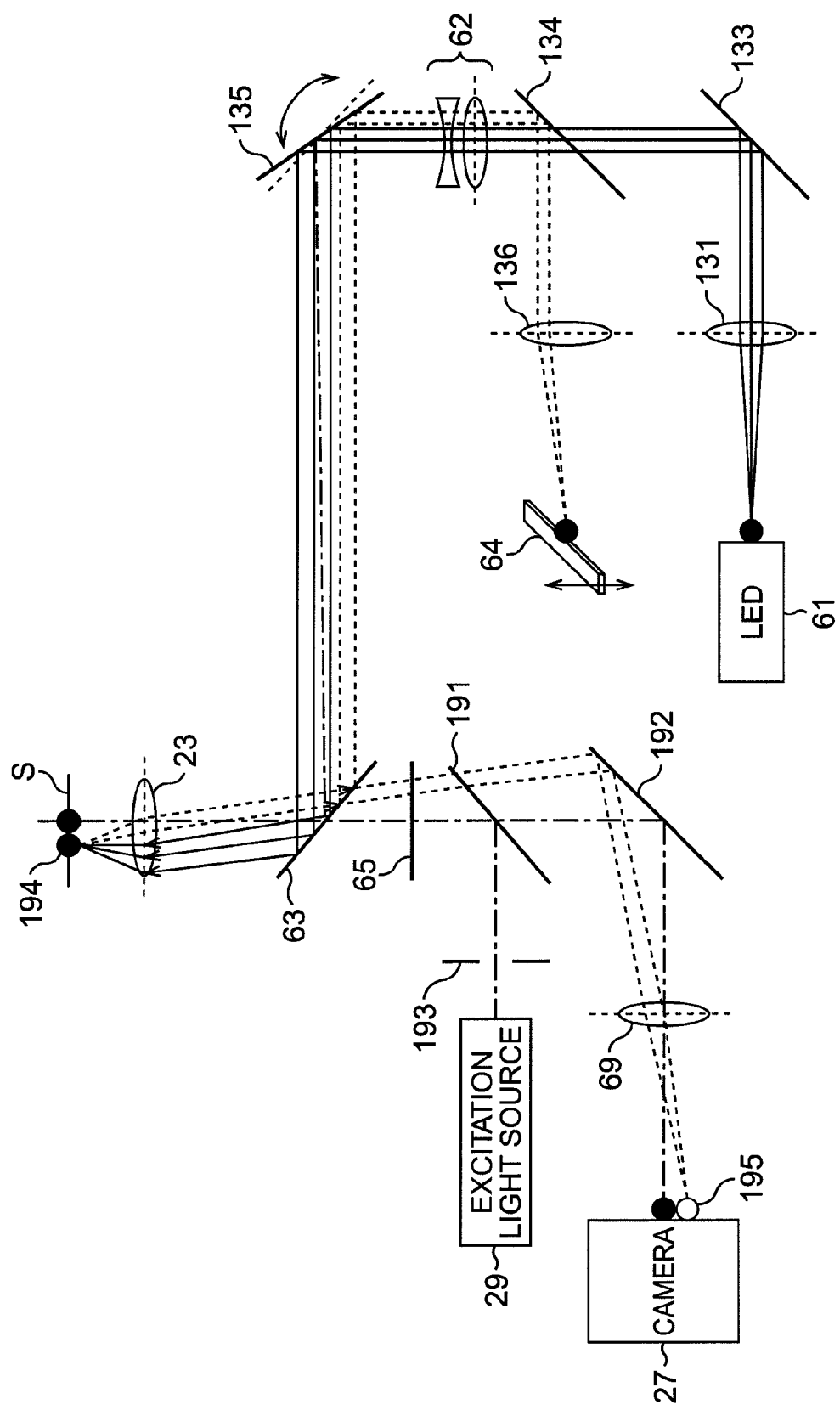
FIG. 7 is a diagram depicting an optical system of a microscope.

FIG. 7 is a diagram depicting the optical paths of the reference light, reflected light, excitation light and fluorescent light in the microscope 11 in general. In FIG. 7, a portion corresponding to that in FIG. 1, FIG. 2 and FIG. 5 is denoted with a same reference number, for which description is omitted when redundant. In FIG. 7, a dashed line indicates an optical axis of an optical system.

In FIG. 7, a dichroic mirror 191 and a mirror 192 are disposed between the imaging lens 69, which is located immediately before the camera 27 and filter 65 in the microscope 11. A diaphragm 193 is disposed between the excitation light source 29 and the dichroic mirror 191.

The excitation light source 29 emits the excitation light and allows the excitation light to enter the dichroic mirror 191 via the diaphragm 193. The diaphragm 193 blocks a part of the excitation light that entered from the excitation light source 29 so as to adjust the light quantity of the excitation light, that is, the thickness of the luminous flux of the excitation light, that passes through the diaphragm 193. The dichroic mirror 191 reflects the excitation light that entered through the diaphragm 193 and irradiates the excitation light to the sample 22 on the glass bottom dish 67 via the filter 65, dichroic mirror 63 and objective lens 23.

In a conventional microscope, the excitation light for exciting a sample is irradiated onto the entire sample located in the visual field of the microscope, but if the wavelength of the fluorescent light from the sample and the wavelength of the reference light are similar, it is difficult to distinguish these lights. Since the excitation light is irradiated onto the entire sample, the excitation light is irradiated not only onto the target sample, but onto other samples, which may damage these non-observation target samples.

In the case of the microscope 11, a diaphragm 193 is disposed between the excitation light source 29 and the dichroic mirror 191, and the light quantity that passes through the diaphragm 193 is adjusted, whereby the irradiation range of the excitation light in the visual field, that is, the thickness of the luminous flux of the excitation light to be irradiated onto the sample, can be changed in an appropriate manner. As a result, unnecessary irradiation of the excitation light on the sample 22 can be prevented.

The dichroic mirror 191 may be rotated by installing a mechanism to make the dichroic mirror 191 rotatable. If the dichroic mirror 191 is rotatable, the optical path of the excitation light can be changed by rotating the dichroic mirror 191, so as to move the irradiation position of the excitation light in the visual field of the microscope 11, that is, on the glass cover 68, to an arbitrary position. Hence the user can freely move the irradiation position of the excitation light, that is, a position where the fluorescent light is observed, and a position of the image of the reference light, while viewing the image captured by the camera 27 or looking through the occular 28.

When the excitation light is irradiated onto the sample 22 on the glass cover 68, the sample 22 emits the fluorescent light. The emitted fluorescent light enters the dichroic mirror 63 via the objective lens 23. The reference light emitted from the LED 61 is reflected on the boundary surface S, and this reflected light also enters the dichroic mirror 63 via the objective lens 23.

In other words, the reference light emitted from the LED 61 enters the half mirror 134 via the lens 131 and mirror 133. The reference light transmitted through the half mirror 134 enters the boundary surface S via the offset lens group 62, motor-operated mirror 135, dichroic mirror 63 and objective lens 23. The reference light reflected on the boundary surface S enters the dichroic mirror 63 as reflected light via the objective lens 23.

The dichroic mirror 63 transmits the fluorescent light which entered through the objective lens 23, and allows it to enter the filter 65. The dichroic mirror 63 reflects the reference light which returned from the objective lens 23, and allows it to enter the CCD 64 via the motor-operated mirror 135, offset lens group 62, half mirror 134 and lens 136, and transmits a part of the reference light which returned from the objective lens 23, and allows it to enter the filter 65.

The reference light reflected by the dichroic mirror 63 enters the half mirror 134 via the motor-operated mirror 135 and the offset lens group 62.

The filter 65 transmits the fluorescent light and reflected light which entered from the dichroic mirror 63, and allows them to enter the dichroic mirror 191. The dichroic mirror 191 transmits the fluorescent light and reference light from the filter 65, and allows them to enter the mirror 192. Specifically, a dichroic mirror, for reflecting a part of the fluorescent light and reference light and allowing them to enter the ocular 28 and transmitting a part of the fluorescent light and reference light and allowing them to enter the mirror 192, is disposed between the dichroic mirror 191 and the mirror 192. Since the ocular 28 condenses the fluorescent light and reference light from this dichroic mirror, and forms the images of these lights, the user can observe the images of the fluorescent light and reference light through the ocular 28.

The mirror 192 reflects the fluorescent light and reference light which entered from the dichroic mirror 191, and allows them to enter the camera 27 via the imaging lens 69. The image captured by the camera 27 is disposed on a device, that is not illustrated, connected to the microscope 11, so the user can observe the images of the fluorescent light and reference light by viewing this image.

If the motor-operated mirror 135 is rotated, the optical path of the reference light changes, hence the position of the image of the reference light on the boundary surface S moves from the center position of the visual field. For example, in FIG. 7, the image 194 of the reference light is formed on a position shifted to the left from the center of the visual field (intersection position of the optical axis and boundary surface S) by the rotation of the motor-operated mirror 135.

If the position of the image 194 of the reference light is shifted from the center of the visual field, the entry position of the reflected light on the dichroic mirror 63 also changes, therefore the position of the image of the reflected light on the light receiving surface of the camera 27 changes accordingly. In FIG. 7, when the image 194 of the reference light is formed on the boundary surface S, the reference light is reflected on the boundary surface S, and enters the camera 27 via the objective lens 23 and imaging lens 69, and the image 195 of the reference light (reflected light) is formed on the light receiving surface of the camera 27. The image 195 of the reference light is formed at a position that is shifted downward in FIG. 7 from the center of the light receiving surface (intersection position of the optical axis and light receiving surface) of the camera 27. Therefore if the position of the image of the reference light on the boundary surface S moves, the position of the image of the reference light on the light receiving surface of the camera 27 also moves, and the user can observe the image of the shifted reference light on the captured image.

In the microscope 11, the dichroic mirror 63 reflects a part of the light of which wavelength is the same as the reference light (reflected light), and transmits a part of the light of which wavelength is the same as the reference light, that is, the rest of the light which was not reflected. The dichroic mirror 63 also transmits the light of which wavelength is the same as the fluorescent light, and the light of which wavelength is the same as the excitation light. For example, if the wavelength of the excitation light and the wavelength of the reference light are the same, a part of the reference light (excitation light) is reflected by the dichroic mirror 63, and the rest of the light transmits through the dichroic mirror 63.

The filter 65 transmits only light of which wavelength is the same as the reference light (reflected light), light of which wavelength is the same as the fluorescent light, and light of which wavelength is the same as the excitation light, and absorbs lights having the other wavelengths. The dichroic mirror 191 reflects light of which wavelength is the same as the excitation light, and transmits light of which wavelength is the same as the fluorescent light and light of which wavelength is the same as the reference light (reflected light). If the wavelength of the excitation light and the wavelength of the reference light are the same, the dichroic mirror 191 reflects a part of the excitation light and reference light, and transmits the rest of the lights (a part of the excitation light and reference light).

Figure 8:
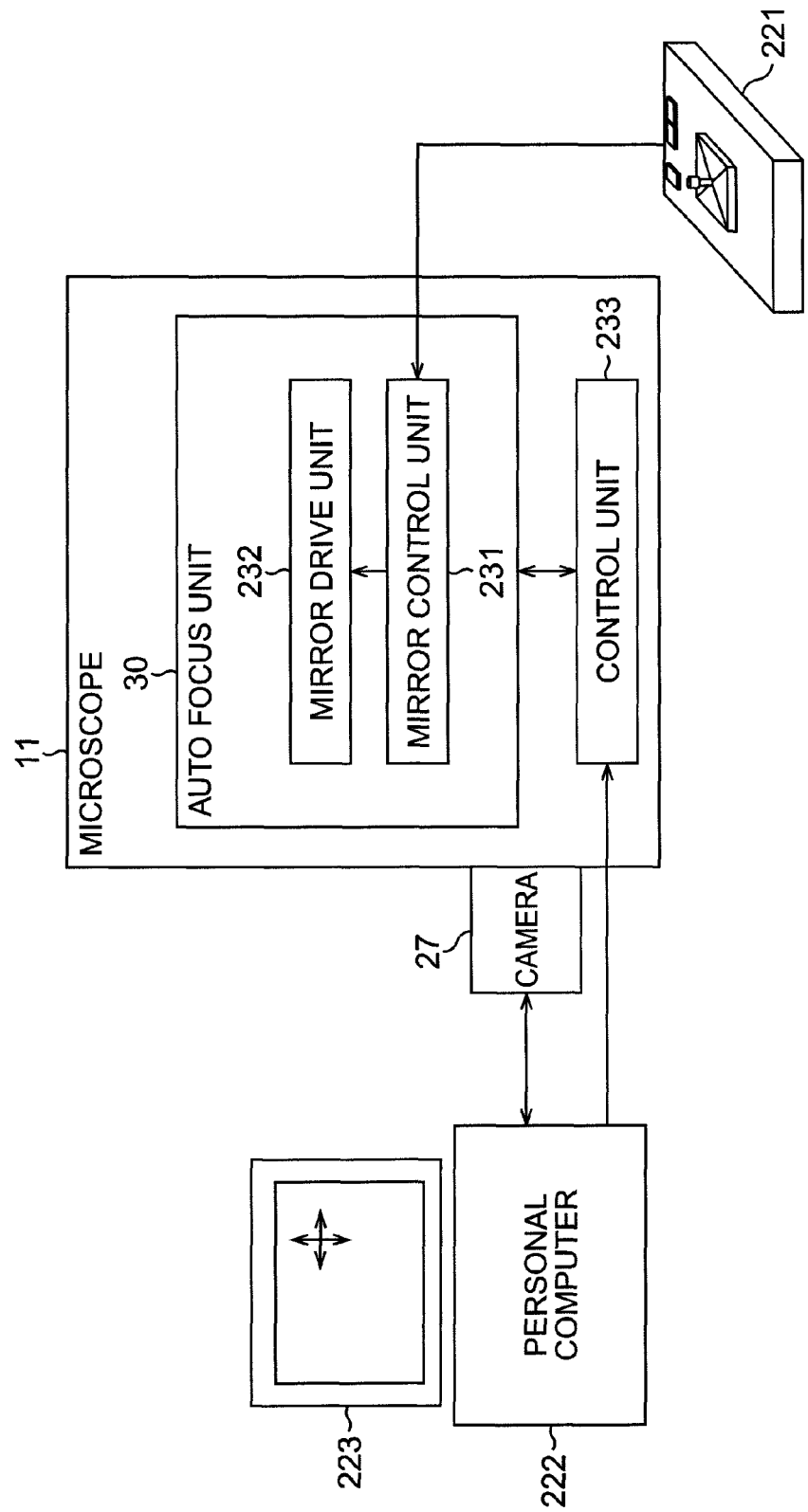
FIG. 8 is a diagram depicting a configuration example of an observation system.

The above described microscope 11 can be applied to an observation system shown in FIG. 8, for example. In FIG. 8, the observation system is comprised of the microscope 11, a mirror operation unit 221, a personal computer 222 and a monitor 223. In the auto focus unit 30, a mirror control unit 231 and a mirror drive unit 232 are disposed.

The mirror operation unit 221 is constituted by a controller for rotating the motor-operated mirror 135, for example, and supplies a signal according to the operation by the user to the mirror control unit 231 of the auto focus unit 30. For example, if the user operates the mirror operation unit 221 and instructs rotation of the motor-operated mirror 135, a signal according to the operation by the user is supplied from the mirror operation unit 221 to the mirror control unit 231. Then the mirror control unit 231 controls the mirror drive unit 232 according to the signal from the mirror operation unit 221, to control rotation of the motor-operated mirror 135. The mirror drive unit 232 drives the motor-operated mirror 135 for rotation under control of the mirror control unit 231.

The personal computer 222 is operated by the user, and controls operation of the microscope 11 according to the operation by the user. For example, the personal computer 222 instructs the ON/OFF of the auto focus, and instructs turning the LED 61 ON to the control unit 233 disposed in the microscope 11. The personal computer 222 also instructs the camera 27 to capture the image of the sample 22.

The control unit 233 of the microscope 11 controls the LED 61 according to the instruction from the personal computer 222, so as to emit reference light from the LED 61, or controls the movement of the objective lens 23 based on the signal obtained by capturing the reflected light, that is, supplied from the CCD 64. In other words, the control unit 233 moves the objective lens 23 in the optical axis direction based on the signal from the CCD 64, so that the image of the reference light is formed on the boundary surface S.

The camera 27 captures the image of the entered fluorescent light and reference light (reflected light) according to the instruction of the personal computer 222, and supplies the captured image to the personal computer 222. The personal computer 222 supplies the image from the camera 27 to the connected monitor 223 to display the image.

According to this observation system, the user can operate the mirror operation unit 221 to rotate the motor-operated mirror 135 and move the position of the image of the reference light to an arbitrary position, while viewing the image of the visual field of the microscope 11 that is displayed on the monitor 223. The user operates the personal computer 222 or the microscope 11 to manipulate the diaphragm 193, so as to adjust the range of the excitation light (thickness of luminous flux) to be irradiated onto the sample 22.

In the above description, the motor-operated mirror 135, which is driven by a motor or the like, is disposed in the auto focus unit 30, but a rotatable mirror, which the user can manually rotate by manipulating the operation unit, may be disposed.

Figure 9:
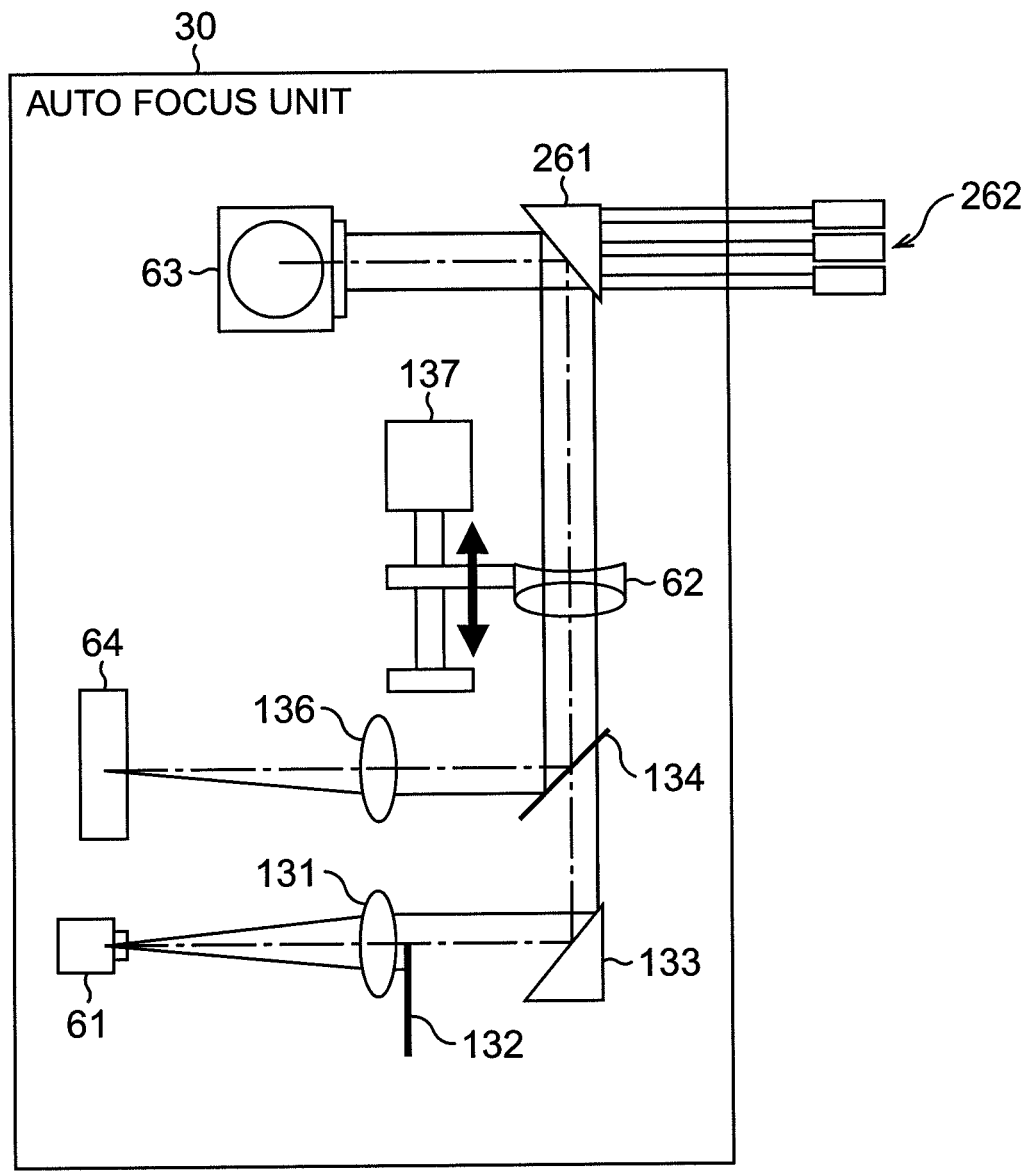
FIG. 9 is a diagram depicting another configuration example of an auto focus unit.

In this case, the auto focus unit 30 is constructed as shown in FIG. 9, for example. In FIG. 9, a portion corresponding to that in FIG. 5 is denoted with a same reference number, for which description is omitted.

The auto focus unit 30 shown in FIG. 9 has a manually-operated mirror 261, instead of the motor-operated mirror 135 in FIG. 5, and an operation unit 262 for rotating the manually-operated mirror 261 is also installed.

The operation unit 262 is operated by the user, and rotates the manually-operated mirror 261 according to the operation by the user. For example, it is assumed that the x axis is a straight line which passes through the center of the reflecting surface of the manually-operated mirror 261, and is in parallel with the normal line of the reflecting surface, and the z axis is a straight line which passes through the center of the reflecting surface, and is perpendicular to the optical axis of the offset lens group 62 and the x axis. And if the y axis is a straight line which passes through the center of the reflecting surface and is perpendicular to the x axis and z axis, then the manually-operated mirror 261 is rotated around the y axis or z axis as a rotation axis by the operation unit 262.

The manually-operated mirror 261 is disposed between the offset lens group 62 and the dichroic mirror 63, so that the center of the reflecting surface thereof is located on the optical axis of the offset lens group 62, and the reflecting surface forms a 45° angle with the optical axis of the offset lens group 62. The manually-operated mirror 261 is rotated by the operation unit 262, and reflects the reference light that entered from the offset lens group 62, and allows it to enter the dichroic mirror 63, and reflects the reflected light that entered from the dichroic mirror 63, and allows it to enter the offset lens group 62.

As a variant form of the embodiment in FIG. 5, the auto focus unit 30 may be constructed without the offset lens group 62.

In concrete terms, just like the auto focus unit 30 in FIG. 5, the auto focus unit 30 comprises an LED 61, dichroic mirror 63, CCD 64, filter 65 (not illustrated), lens 131, half mask 132, mirror 133, half mirror 134, motor-operated mirror 135 and lens 136, but the difference is that the offset lens group 62 and the stepping motor 137 are not included.

The reference light emitted from the LED 61 enters the half mirror 134 via the lens 131 and mirror 133, and a part of the reference light that entered from the mirror 133 to the half mirror 134 transmits through the half mirror 134, and enters the motor-operated mirror 135. The reflected light which entered from the dichroic mirror 63 to the motor-operated mirror 135 is reflected on the motor-operated mirror 135, and enters the half mirror 134.

The offset lens is not installed in the auto focus unit 30, therefore when the motor-operated mirror 135 is not rotating, the position of the image of the reference light is the same position as the focal position of the objective lens 23, and the image of the reference light is not moved in the optical axis direction of the objective lens 23.

In the above description, the position of the image of the reference light is moved by the motor-operated mirror 135, but the position of the image of the reference light on the boundary surface S may be moved by rotating the dichroic mirror 63 without installing the motor-operated mirror 135.

The filter 65 may be installed between the dichroic mirror 191 and the mirror 192, or may be installed between the mirror 192 and the imaging lens 69, not necessarily between the dichroic mirror 63 and the dichroic mirror 191.

Since the motor-operated mirror 135 or manually-operated mirror 261, for changing the optical path of the reference light, is installed in the auto focus unit 30, the position of the image of the reference light on the boundary surface S can be moved. Furthermore the filter 65 for transmitting a light having a wavelength of the reflected light on the boundary surface S, that is, the reference light, is installed in the optical system between the objective lens 23, which is disposed to face the sample 22, and the camera 27 or the ocular 28, so the user can observe the image of the reference light in the visual field of the microscope 11. Therefore the user can move the position of the image of the reference light to an arbitrary position in the visual field while viewing the image, whereby the observation environment of the sample 22 in the microscope 11 can be improved.

In the microscope 11, the reference light used for the auto focus control of the objective lens 23 becomes visible by the filter 65, so the user can visually recognize the image of the reference light along with the sample 22, and can move the reference light to an arbitrary position.

For example, if the reference light is moved outside the area of the sample 22 to be an observation target when irradiation of the reference light on the sample 22 damages the sample 22, and fluorescent light emitted from the sample 22 deteriorates, then the observation environment of the sample 22 can be further improved.

In concrete terms, the reference light is moved to an area within the observation field of the microscope 11 and an area outside the observation field of the camera 27.

The effective visual field of the objective lens 23 is a circular area of which radius is 22 to 25 mm, and this area becomes the observation field of the microscope 11. In other words, the observation field of the microscope 11 is an area of the sample 22 which the user can observe through the ocular 28. The observation field of the camera 27, on the other hand, is a part of the area of the observation field of the microscope 11, and is determined by the size of the effective visual field (magnification) of the objective lens 23 and the size of the light receiving surface of the image sensing element of the camera 27. The observation visual field of the camera 27 is a 6.6 mm×8.8 mm rectangular area, for example.

Therefore if the reference light is moved to an area which is within the observation field of the microscope 11 and to outside the observation field of the camera 27, at least the sample 22 in the observation visual field of the camera 27 is not affected by the reference light. In this case, the user cannot check the image of the reference light on the image of the sample 22 captured by the camera 27, but can confirm the image of the reference light through the ocular 28. The area on the sample 22 that is within the observation field of the microscope 11 and outside the observation field of the camera 27 is also called the "safe area".

If the reference light is moved to a position further distant from the center of the observation field of the microscope 11, the optical path of the reference light moves to a more distant position from the optical axis of the objective lens 23, so the image forming position of the reference light shifts due to an aberration of the objective lens 23. Then the distance from the focal position of the objective lens 23 to the image forming position of the reference light is shifted, and the objective lens 23 is moved by auto focus, and as a result, out of focus occurs to the sample 22.

Therefore the position of the objective lens 23, before moving the reference light may be recorded so as to correct the out of focus of the sample 22, generated by movement of the reference light, using this position. In this case, the microscope 11 and auto focus unit 30 may be constructed as shown in FIG. 10.

Figure 10:
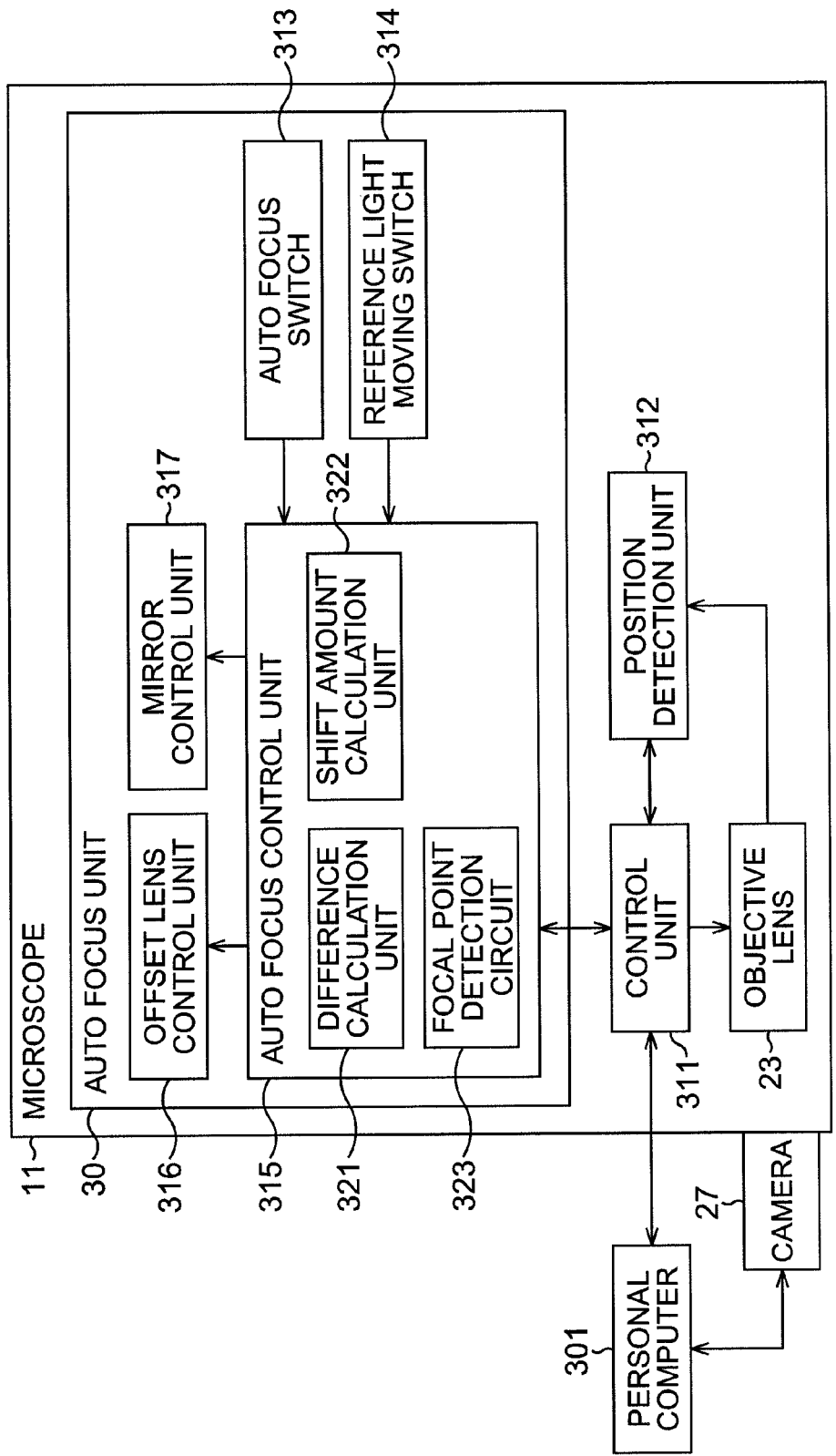
FIG. 10 is a diagram depicting a configuration example of the functions of a microscope and auto focus unit.

FIG. 10 is a diagram depicting a configuration example of the functions of the microscope 11 and the auto focus unit 30. In FIG. 10, a portion corresponding to that in FIG. 1 is denoted with a same reference number, for which description is omitted.

A personal computer 301 is connected to the microscope 11, and a control unit 311 of the microscope 11 controls the operation of the microscope 11 in general according to the instruction from the personal computer 301 and instruction from the auto focus unit 30.

For example, the control unit 311 has a position detection unit 312 detect the position of the objective lens 23, and moves the objective lens 23 in the optical axis direction of the objective lens 23 (hereafter called the "Z direction"). The position detection unit 312 is constituted by a linear encoder, for example, which detects a position of the objective lens 23 in the Z direction, and supplies positional information to indicate this detection result to the control unit 311.

The personal computer 301 has the camera 27 capture the image of the sample 22, and obtains and displays the captured image from the camera 27, or instructs to a control unit 311 to control the operation of the microscope 11 according to the operation by the user.

The auto focus unit 30 has an auto focus switch 313 which is operated to instruct the ON/OFF of the auto focus control of the objective lens 23, and a reference light moving switch 314 which is operated to move the reference light. The auto focus control unit 315 performs auto focus control by instructing the offset lens control unit 316 to move the offset lens group 62 according to the operation of the auto focus switch 313, and instructing the control unit 311 to move the objective lens 23.

The auto focus control unit 315 also instructs the mirror control unit 317 to rotate the motor-operated mirror 135 according to the operation of the reference light moving switch 314, and the mirror control unit 317 rotates the motor-operated mirror 135 according to this instruction to shift the optical path of the reference light.

The auto focus control unit 315 has a difference calculation unit 321 which determines the difference of the positions of the objective lens 23 before and after moving the reference light, a moving amount calculation unit 322 which calculates the moving amount to move the offset lens group 62 based on the difference, and a focal point detection circuit 323 which detects the focal point of the objective lens 23.

The focal point detection circuit 323 is connected to the CCD 64, and detects a focal position of the objective lens 23 based on the photoelectric conversion signal from the CCD 64, and the auto focus control unit 315 instructs the control unit 311 to move the objective lens 23 based on the detection result.

When the user performs fluorescent observation on a sample 22, the user operates the personal computer 301 to instruct to display the image of the sample 22. Then the personal computer 301 instructs the control unit 311 to irradiate the excitation light onto the sample 22 according to the operation by the user, and the control unit 311 emits the excitation light from the excitation light source 29 according to the instruction.

When the excitation light from the excitation light source 29 is irradiated onto the sample 22, and the fluorescent light is emitted from the sample 22, the camera 27 captures the image of the sample 22 by receiving the fluorescent light from the sample 22, and supplies the captured image to the personal computer 301.

When the personal computer 301 obtains and displays the image of the sample 22 in this way, the user operates the auto focus switch 313 to focus on the sample 22, and instructs the start of auto focus control. Then the auto focus unit 30 and the microscope 11 moves the reference light while performing auto focus control, and starts the reference light moving processing, which is a processing to correct the shift of focus on the sample 22.

Figure 11:
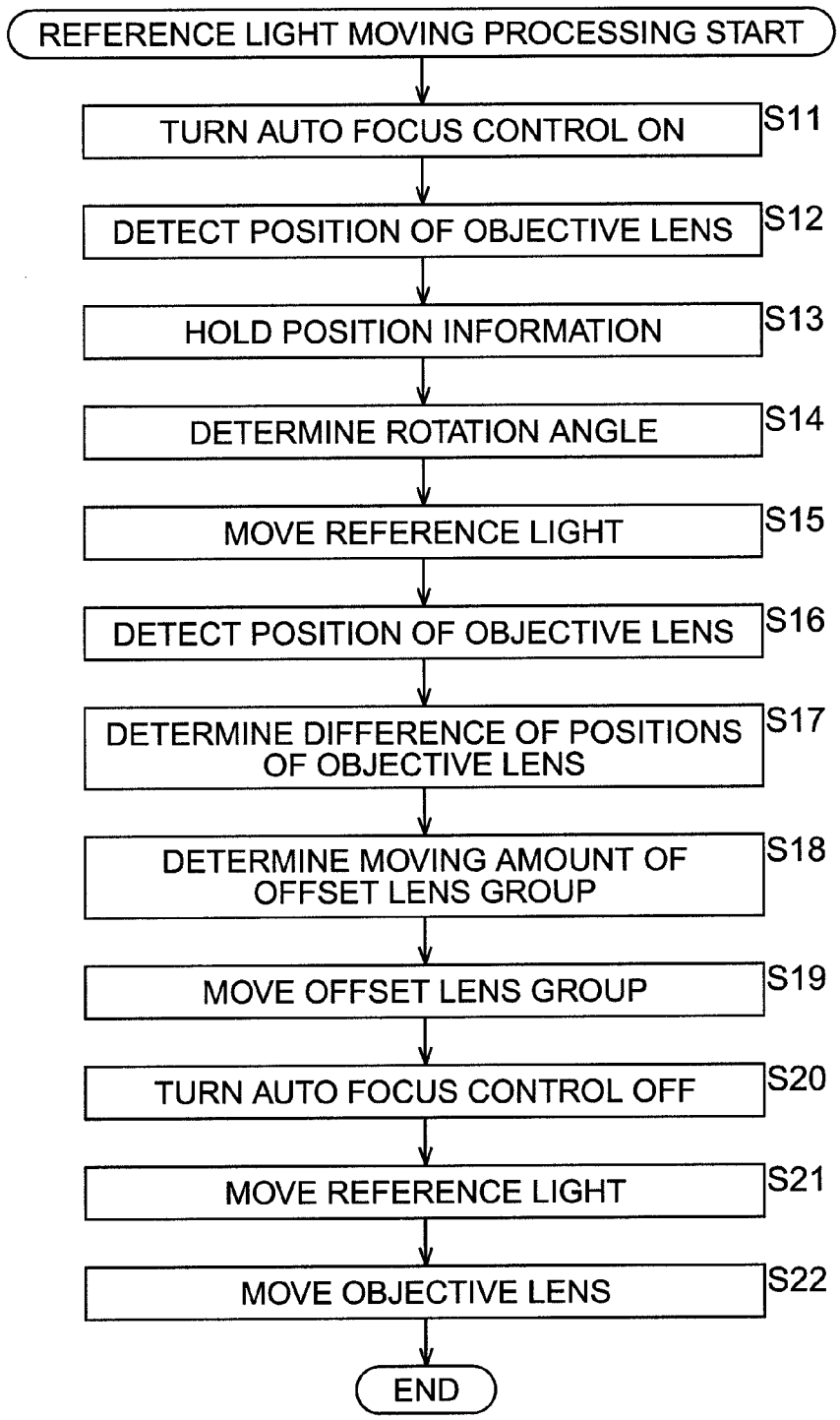
FIG. 11 is a flow chart depicting a reference light moving processing.

The reference light moving processing will now be described with reference to the flow chart in FIG. 11.

In step S11, the auto focus control unit 315 turns the auto focus control of the objective lens 23 ON. In other words, when a signal according to the operation by the user is supplied from the auto focus switch 313 to the auto focus control unit 315, auto focus control is started.

Based on the detection result of the focal position by the focal point detection circuit 323, the auto focus control unit 315 instructs the control unit 311 to move the objective lens 23. The control unit 311 moves the objective lens 23 so that the focal point of the objective lens 23 comes onto the sample 22.

When the movement of the offset lens group 62 is instructed by the operation by the user, the auto focus control unit 315 instructs the offset lens control unit 316 to move the offset lens group 62. The offset lens control unit 316 drives the stepping motor 137 according to this instruction, and moves the offset lens group 62.

When the auto focus control is started like this, the focal point of the objective lens 23 is located on the sample 22, and the sample 22 is focused. In this state, the reference light is positioned at the center of the observation field area of the microscope 11. Hereafter the center position of the observation field area of the microscope 11 is also called the "visual field center position".

Immediately after observation of the sample 22 starts, the reference light is at the visual field center position, so the user operates the reference light moving switch 314 to instruct moving the reference light to the safe area.

By this, a signal according to the operation by the user is supplied from the reference light moving switch 314 to the auto focus control 315, and according to this signal, the auto focus control unit 315 requests the control unit 311 to provide position information to indicate the position of the objective lens 23 in the Z direction. Then the control unit 311 instructs the position detection unit 312 to detect the position of the objective lens 23.

In step S12, the position detection unit 312 detects the position of the objective lens 23, and supplies the position information to indicate this position to the auto focus control unit 315 via the control unit 311. Hereafter the position of the objective lens 23 in the Z direction detected in a state before the reference light is moved, that is, in a state where the reference light is in the visual field center position, is also called the "reference position".

In step S13, the auto focus control unit 315 holds the position information from the position detection unit 312. Then the auto focus control unit 315 instructs the mirror control unit 317 to rotate the motor-operated mirror 135.

In step S14, the mirror control unit 317 determines the rotation angle of the motor-operated mirror 135 for moving the image of the reference light from the visual field center position on the sample 22 to the safe area. In other words, the mirror control unit 317 determines the distance from the visual field center position to the safe area based on the pre-recorded magnification of the objective lens 23, and the size (area) of the light receiving surface of the image sensing element of the camera 27. In other words, when the sample 22 is observed by the camera 27, the moving distance of the reference light is determined based on the observation magnification of the observation optical system of the sample 22. Based on this distance, the mirror control unit 317 determines the rotation angle to rotate the motor-operated mirror 135 that is required for moving the reference light for this distance.

For example, if the focal length of the second object is 200 mm, and the reference light is moved by x (μm) within the visual field of the objective lens 23 of which magnification is M, then the incident angle of the reference light to the sample 22 changes by angle θ=Arctan (x/(200/M)). Therefore if the motor-operated mirror 135 is tilted (rotated) for a half angle of angle θ, the incident angle to the sample 22 of the reference light changes by the incident angle θ, and the reference light can be moved by x (μm) within the visual field of the objective lens 23.

After determining the moving distance x of the reference light based on the observation magnification of the observation optical system of the sample 22, the mirror control unit 317 calculates the following Expression (1) to determine the rotation angle θ' of the motor-operated mirror 135.

$$\theta'=0.5\times\text{Arctan}(x/(200/M)) \quad (1)$$

In step S15, the mirror control unit 317 rotates the motor-operated mirror 135 by the determined rotation angle, and moves the reference light to the safe area. When the reference light moves, the imaging position of the reference light is shifted with respect to the Z direction, due to an aberration of the objective lens 23. Then the objective lens 23 is moved by the auto focus control, and the sample 22 moves out of focus.

If the position of the objective lens 23 in the Z direction here becomes the reference position detected in step S12, the sample 22 is focused. Then processing to move the offset lens group 62 is performed so that the objective lens 23 is moved to the reference position shown in the position information held in the auto focus control unit 315.

In other words, the auto focus control unit 315 requests the position information to the control unit 311, and in response to this request, the control unit 311 instructs the position detection unit 312 to detect the position of the objective lens 23. Then in step S16, the position detection unit 312 detects a position of the objective lens 23 in the Z direction, and supplies the position information showing this detection result in the auto focus control unit 315 via the control unit 311.

In step S17, the difference calculation unit 321 determines the moving distance of the objective lens 23 from the reference position, using the position information before moving the reference light held by the auto focus control unit 315, and the position information after moving the reference light, which is newly obtained from the position detection unit 312. In other words, the difference of positions of the objective lens 23 in the Z direction is determined.

In step S18, the moving amount calculation unit 322 determines the moving amount to move the offset lens group 62 using the difference of positions determined by the difference calculation unit 321.

For example, the moving amount calculation unit 322 holds an offset table in which the correspondence of a difference value of positions of the objective lens 23 and a moving amount to move the offset lens group 62 with this difference value, which was actually measured in advance, is recorded. The moving amount calculation unit 322 refers to the offset table being held, and reads the moving amount which corresponds to the difference of positions, determined by the difference calculation unit 321, so as to determine the moving amount to move the offset lens group 62.

If the offset lens group 62 is moved for this moving amount, the shift of the distance from the focal point of the objective lens 23 to the sample 22, generated by the movement of the reference light, is corrected, and the focus of the objective lens 23 comes to be on the sample 22 by auto focus control. The auto focus control unit 315 instructs the offset lens control unit 316 to move the offset lens group 62, so that the offset lens group 62 is moved for the moving amount determined by the moving amount calculation unit 322.

In step S19, the offset lens control unit 316 moves the offset lens group 62 for the moving amount instructed by the auto focus control unit 315. If the offset lens group 62 is moved like this, the focal point detection circuit 323 detects that the focal point of the objective lens 23 is not located on the sample 22. Then the objective lens 23 is moved to the reference position by the auto focus control, the sample 22 is focused, and a clear image of the focused sample 22 is displayed on the personal computer 301 monitor.

Maintaining the position of the objective lens 23 at the reference position, just before shifting the optical path of the reference light by moving the offset lens group 62 like this, is achieved by maintaining the focal position of the objective lens 23 before and after moving the reference light so that the sample 22 is focused.

When the image of the sample 22 captured by the camera 27 is displayed on the personal computer 301, and the user finishes the fluorescent observation of the sample 22, the user operates the reference light moving switch 314 to replace the sample 22, or ends the observation by the microscope 11. In other words, operation to return the reference light to the visual field center position is performed. The signal according to this operation is supplied from the reference light moving switch 314 to the auto focus control unit 315.

In step S20, the auto focus control unit 315 turns the auto focus control OFF according to the signal from the reference light moving switch 314, and instructs the mirror control unit 317 to move the reference light.

In step S21, the mirror control unit 317 rotates the motor-operated mirror 135 according to the instruction of the auto focus control unit 315, so as to move the reference light to the visual field center position. The auto focus control unit 315 also instructs the control unit 311 to move the objective lens 23 to the reference position based on the position information being held.

In step S22, the control unit 311 moves the objective lens 23 to the reference position according to the instruction from the auto focus control unit 315, and the reference light moving processing ends.

In this way, the microscope 11 and the auto focus unit 30 move the reference light to the safe area, and moves the offset lens group 62 so that the focal position of the objective lens 23 is maintained at the position before moving the reference light. Thus the damage to the sample 22 is prevented by moving the reference light out of the observation field of the camera 27, and out of focus, due to the movement of the reference light, can be corrected, and the observation environment of the microscope 11 can be improved.

The personal computer 301 or the microscope 11 may determine the moving amount to move the offset lens group 62 using an offset table.

The offset lens group 62 may gradually be moved without an offset table, so that the movement of the offset lens group 62 is stopped when the position of the objective lens 23 comes to the reference position.

Figure 12:
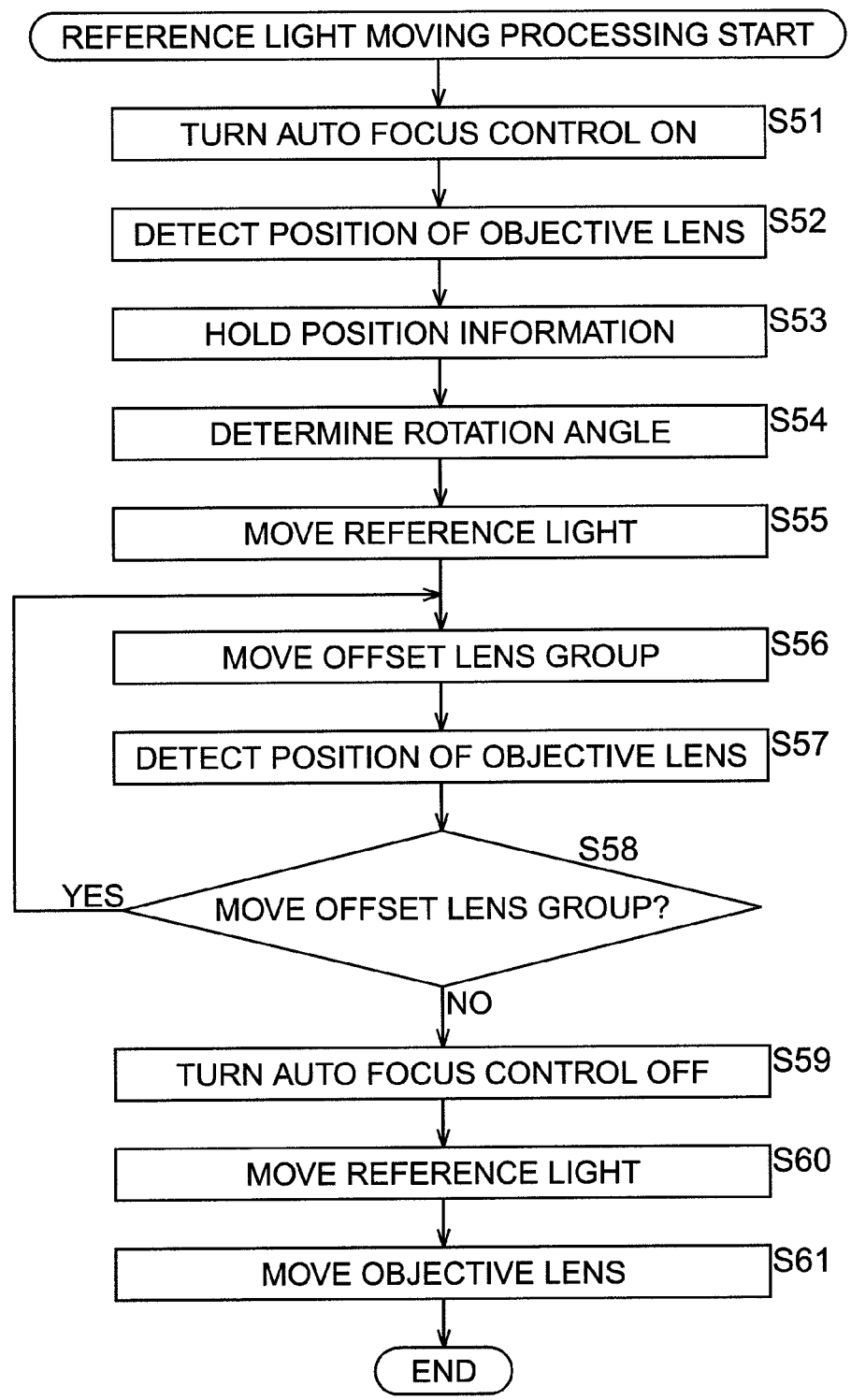
FIG. 12 is a flow chart depicting a reference light moving processing.

The reference light moving processing performed in such a case will now be described with reference to the flow chart in FIG. 12. The processing from step S51 to step S55 is the same as the processing from steps S11 to S15 in FIG. 11 respectively, hence description thereof is omitted. In other words, the auto focus control is turned ON by this processing, and the reference light is moved to the safe area.

In step S56, the offset lens control unit 316 moves the offset lens group 62 for a predetermined moving amount according to the instruction from the auto focus control unit 315. The direction of moving the offset lens group 62 here is determined based on the position indicated by the position information of the objective lens 23 that was obtained last and the reference position, for example. The moving amount of the offset lens group 62 may be determined based on these two positions.

When the offset lens group 62 is moved like this, the focal point detection circuit 323 detects that the focal point of the objective lens 23 is not positioned on the sample 22, and the object lens 23 is moved by auto focus control.

When the offset lens group 62 is moved, the auto focus control unit 315 requests the position information to the control unit 311, and in response to this request, the control unit 311 instructs the position detection unit 312 to detect the position of the objective lens 23.

In step S57, the position detection unit 312 detects the position of the objective lens 23 in the Z direction, and supplies the position information to indicate this detection result to the auto focus control unit 315 via the control unit 311.

In step S58, the auto focus control unit 315 judges whether or not the offset lens group 62 is moved. In other words, the auto focus control unit 315 compares the position indicated in the position information, which was newly obtained from the position detection unit 312, and the reference position, indicated in the position information being held. If these positions match, the auto focus control unit 315 judges that the focal point of the objective lens 23 is positioned on the sample 22, and the sample 22 is focused, and therefore the offset lens group 62 is not moved.

If it is judged that the offset lens group 62 is moved in step S58, this means that the sample 22 is not sharply focused, so the processing returns to step S56, and the above mentioned processing is repeated.

If it is judged that the offset lens group 62 is not moved in step S58, on the other hand, this means that out of focus, generated by the movement of the reference light, has been corrected. So processing advances to step S59. Then processings in step S59 to step S61 are performed, but these processings are the same as those in step S20 to step S22 in FIG. 11, hence description thereof is omitted.

When processing in step S61 is performed and the objective lens 23 is moved to the reference position, the reference light movement processing ends.

In this way, the microscope 11 and the auto focus unit 30 moves the reference light to the safe area, and gradually moves the offset lens group 62 so that the focal position of the objective lens 23 is maintained to be the position before moving the reference light. Thus damage to the sample 22 is prevented by moving the reference light out of the observation field of the camera 27, and out of focus, due to movement of the reference light, can be corrected, and the observation environment of the microscope 11 can be improved.

In the above description, the offset lens group 62 is moved to correct the shift of the distance between the objective lens 23 and the sample 22, generated by movement of the reference light, and is corrected, but the shift of the distance may be corrected based on the signal obtained by the CCD 64 receiving the reflected light from the sample 22.

If the signal which the CCD 64 obtains by receiving the reflected light from the sample 22 is called a "detection signal", then the moving amount of the objective lens 23 during the auto focus control is determined based on the distribution intensity of the detection signal on the light receiving surface of the CCD 64, the dividing position and the dividing ratio of the distribution intensity.

The focal point detection circuit 323 simulates moving the focal position of the objective lens 23 by changing the dividing position and the dividing ratio of the distribution intensity of the detection signal, so that the focal point of the objective lens 23 is positioned on the sample 22 by the auto focus control.

The auto focus switch 313 and the reference light moving switch 314 may be installed in the microscope 11, and not necessarily in the auto focus unit 30. For example, the reference light moving switch 314 may be disposed in a holding portion for securing the glass bottom dish 67 containing the sample 22 on the motor-operated stage 21. In this case, the user can easily operate the reference light moving switch 314 when the glass bottom dish 67, used for observation, is replaced.

The auto focus unit 30 may perform slit projection type auto focus control. In this case, the slit is disposed between the LED 61 of the auto focus unit 30, shown in FIG. 5, and the lens 131, and the slit type reference light is irradiated onto the sample 22.

Embodiments of the present invention are not limited to the above mentioned embodiments, but numerous modifications can be made without departing from the spirit and scope of the invention.

The invention claimed is:

1. An auto focus apparatus that is installed in a microscope, which includes an observation optical system for capturing a light emitted from a sample by an imaging section via an objective lens, comprising:
   an illumination optical system, for detecting a focal point, which irradiates a light onto the sample via the objective lens;
   an imaging optical system, for detecting a focal point, which forms an image of a reflected light reflected from the sample via the objective lens; and a setting section disposed on a common optical path of the illumination optical system and the imaging optical system, wherein the setting section sets an irradiation position of the light for detecting the focal point on the sample to an area within an observation field of the objective lens and out of an observation field of the imaging section by shifting the irradiation position in a direction approximately perpendicular to an optical axis of the illumination optical system.

2. The focus apparatus according to claim 1, wherein the setting section comprises a reflecting surface that reflects the light for detecting a focal point, and rotation control section that rotates the reflecting surface around a straight line, and wherein the irradiation position of the light for detecting the focal point on the sample is controlled by a rotation angle of the reflecting surface.

3. The auto focus apparatus according to claim 1, wherein the setting section calculates a control value for setting the irradiation position of the light for detecting the focal point based on an observation magnification of the observation optical system.

4. The auto focus apparatus according to claim 3, wherein the setting section calculates a control value for setting the irradiation position of the light for detecting the focal point based on an observation magnification of the observation optical system.

* * * * *